(12) United States Patent
Teramoto et al.

(10) Patent No.: US 7,213,838 B2
(45) Date of Patent: May 8, 2007

(54) INFLATOR

(75) Inventors: Hiroshi Teramoto, Hikone (JP);
Shinich Tanaka, Hikone (JP)

(73) Assignee: Takata Corporation, Tokyo (JP)

( * ) Notice: Subject to any disclaimer, the term of this patent is extended or adjusted under 35 U.S.C. 154(b) by 293 days.

(21) Appl. No.: 10/689,036

(22) Filed: Oct. 21, 2003

(65) Prior Publication Data

US 2005/0082803 A1    Apr. 21, 2005

(51) Int. Cl.
*B60R 21/26* (2006.01)
(52) U.S. Cl. .................. 280/737; 280/741
(58) Field of Classification Search ........... 280/730.2, 280/737, 741, 742, 740, 736, 728.2; 137/68.13; B60R 21/26

See application file for complete search history.

(56) References Cited

U.S. PATENT DOCUMENTS

| 5,788,270 | A | | 8/1998 | Haland et al. | |
| 5,794,973 | A | * | 8/1998 | O'Loughlin et al. | 280/737 |
| 6,123,355 | A | * | 9/2000 | Sutherland | 280/728.2 |
| 6,145,876 | A | | 11/2000 | Hamilton | |
| 6,155,600 | A | | 12/2000 | Reynolds et al. | |
| 6,176,517 | B1 | | 1/2001 | Hamilton et al. | |
| 6,293,581 | B1 | | 9/2001 | Saita et al. | |
| 6,296,274 | B1 | * | 10/2001 | Stevens et al. | 280/737 |
| 6,588,796 | B2 | * | 7/2003 | Webber et al. | 280/737 |
| 6,746,046 | B2 | * | 6/2004 | Rink et al. | 280/737 |
| 6,755,438 | B2 | | 6/2004 | Rink et al. | |
| 6,805,377 | B2 | | 10/2004 | Krupp et al. | |
| 6,820,898 | B2 | * | 11/2004 | Dinsdale et al. | 280/737 |
| 6,846,013 | B2 | * | 1/2005 | Smith | 280/740 |
| 6,851,705 | B2 | * | 2/2005 | Young et al. | 280/737 |
| 6,854,763 | B2 | * | 2/2005 | Dinsdale et al. | 280/737 |
| 2004/0084885 | A1 | | 5/2004 | Burns et al. | |
| 2005/0104349 | A1 | | 5/2005 | Stevens et al. | |
| 2005/0116454 | A1 | | 6/2005 | Stevens et al. | |
| 2005/0151358 | A1 | | 7/2005 | Burns et al. | |
| 2005/0184494 | A1 | | 8/2005 | Sakata | |
| 2005/0200103 | A1 | | 9/2005 | Burns et al. | |
| 2005/0218638 | A1 | | 10/2005 | Burns et al. | |
| 2005/0248133 | A1 | | 11/2005 | Jomura | |

FOREIGN PATENT DOCUMENTS

JP    2002-337647    11/2002
WO   WO 00/32447 A1    6/2000

* cited by examiner

*Primary Examiner*—Paul N. Dickson
*Assistant Examiner*—Drew J. Brown
(74) *Attorney, Agent, or Firm*—Foley & Lardner LLP

(57) ABSTRACT

An inflator for an airbag including an elongated pipe containing an inert gas and a pair of igniters. The igniters are positioned at opposite ends of the tube so that the inert gas can be generally evenly distributed out of a plurality of spaced apart openings positioned along the length of the tube. The openings are sealed until the inert gas reaches a predetermined pressure.

14 Claims, 3 Drawing Sheets

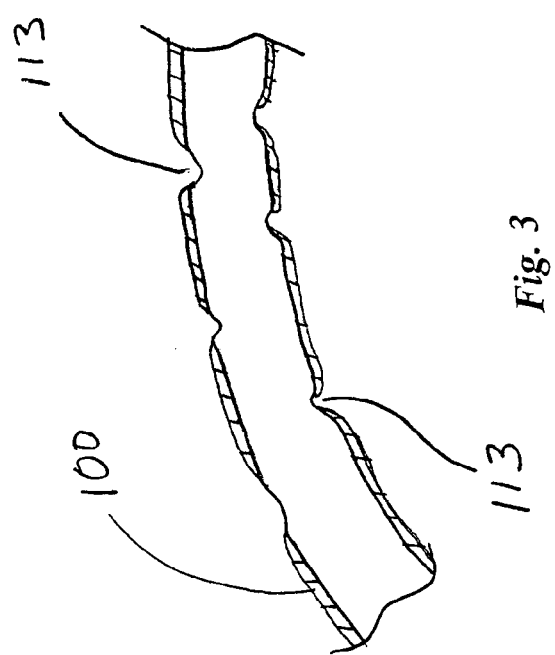
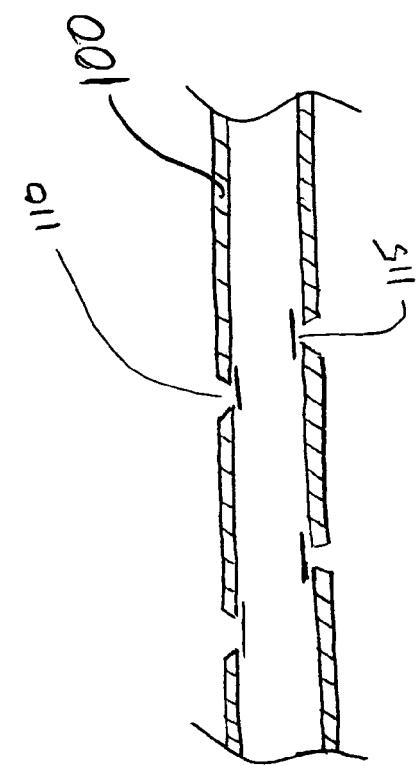
Fig. 3
Fig. 4

INFLATOR

BACKGROUND

The present invention relates to an inflation device for a protective cushion for protection of a vehicle occupant. More particularly, the present invention relates to an inflation device for providing inflation gas for a cushion which is folded and disposed along an upper corner of a side of a vehicle cabin in the normal state and is inflated into a curtain shape to expand over windows of side doors and a B-pillar in the event of a side impact collision or roll-over of the vehicle.

Airbag devices mounted in vehicles such as automobiles typically include a gas generator or inflator. The inflator operates to inflate an airbag which is positioned to protect a passenger's body when the vehicle is involved in an emergency situation such as a collision.

Characteristics of an airbag are determined to a large extent by the inflator. For example, the location of the inflator may cause portions of the airbag to inflate at different rates. Typically, a portion of the airbag located closest to the inflator will inflate faster than a portion of the airbag located a location remote from the inflator. As a result, after an emergency condition is detected, certain portions of the airbag may require more time to reach an inflated state adequate to protect an occupant of the vehicle.

Furthermore, passengers sitting near the side of a vehicle are much closer to the point of collision during a side impact than they are in the case of a front impact to the vehicle. Thus, the importance of rapid and complete inflation of the airbag is heightened when the vehicle is involved in a side impact collision.

SUMMARY OF THE INVENTION

According to an embodiment of the present invention a protecting device for an occupant of a vehicle is provided. The device includes an airbag positioned to inflate along an interior side of a vehicle and a tube filled with pressurized gas configured to extend along the side of the vehicle in the longitudinal direction of the vehicle and being filled with pressurized gas. The tube includes a plurality of openings in the tube positioned to allow the pressurized gas to enter and inflate the airbag. A plurality of inflation devices are connected to the tube, wherein each inflation device produces an exhaust gas for further pressurizing the pressurized gas.

The following additional features may be included in further exemplary embodiments of a protecting device according to the present invention. Each opening may be covered by a frangible seal configured to break and release the gas into the airbag when the pressurized gas reaches a predetermined pressure. The inflation devices may be located in an end of the tube. Each of the inflation devices may include an igniter and a cap containing a booster propellant. The device may be configured so that at least two of the openings are positioned to face in generally opposite directions so that gas exiting the tube and entering the airbag through the at least two openings enters the airbag in generally opposing directions. In addition, the tube may be curved along its length to conform to the shape of the airbag. The length of the tube may correspond generally to the distance between the A and C pillars of the vehicle.

According to another embodiment of the present invention an inflator for an airbag is provided. The inflator includes an elongated pipe containing an inert gas and a pair of igniters. The igniters are positioned at opposite ends of the tube and the tube contains a plurality of spaced apart openings positioned along the length of the tube. The openings are sealed until the inert gas reaches a predetermined pressure.

The following additional features may be included in further exemplary embodiments of an inflator according to the present invention. The inert gas may be pre-pressurized. Each of the openings may be covered by a rupturable seal. The inflator may further include a gas inlet for charging the inert gas into the pipe. The gas inlet may be sealed by ball welding. The pipe may be curved. The inflator may also further include a cap covering the igniter and containing booster propellant.

According to still another embodiment of the present invention a device for protecting an occupant of a vehicle is provided. The device includes an airbag positioned to inflate along an interior side of a vehicle and a pipe having a sealed opening at each end and extending in the longitudinal direction of the vehicle along the upper part of the airbag and configured to conform to the shape of the upper part of the airbag. The pipe is filled with pressurized gas and includes a plurality of gas outflow openings positioned along the length of the pipe to allow the pressurized gas to enter and inflate the airbag. The gas outflow openings are sealed until the pressurized gas reaches a predetermined pressure. A pair of inflation devices are connected to the tube and each inflation device includes an initiator and a booster propellant for producing an exhaust gas for further pressurizing the pressurized gas. Each inflation device is positioned in one of the sealed openings located at the ends of the pipe so that the initiator can receive a triggering signal from a control device when the occurrence of a vehicle collision is detected by a sensor.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3 is a cross-sectional view of a portion of a pipe according to an embodiment of the present invention.

FIG. 4 is a cross-sectional view of a portion of a pipe according to another embodiment of the present invention.

DETAILED DESCRIPTION

Hereinafter, embodiments of the present invention will be described with reference to the attached drawings.

According to an embodiment of the present invention an inflator is provided. The inflator includes a stored inert gas, such as argon or helium, contained in a tube or pipe. The stored gas may be pre-pressurized. An initiator or igniter and a booster propellant are positioned at both ends of the tube.

The initiator ignites the booster material producing hot expanding gas which functions to compress and raise the pressure of the stored inert gas. The pressure of the inert gas rises until an opening in the pipe opens releasing the inert gas into the airbag.

Figure 1:
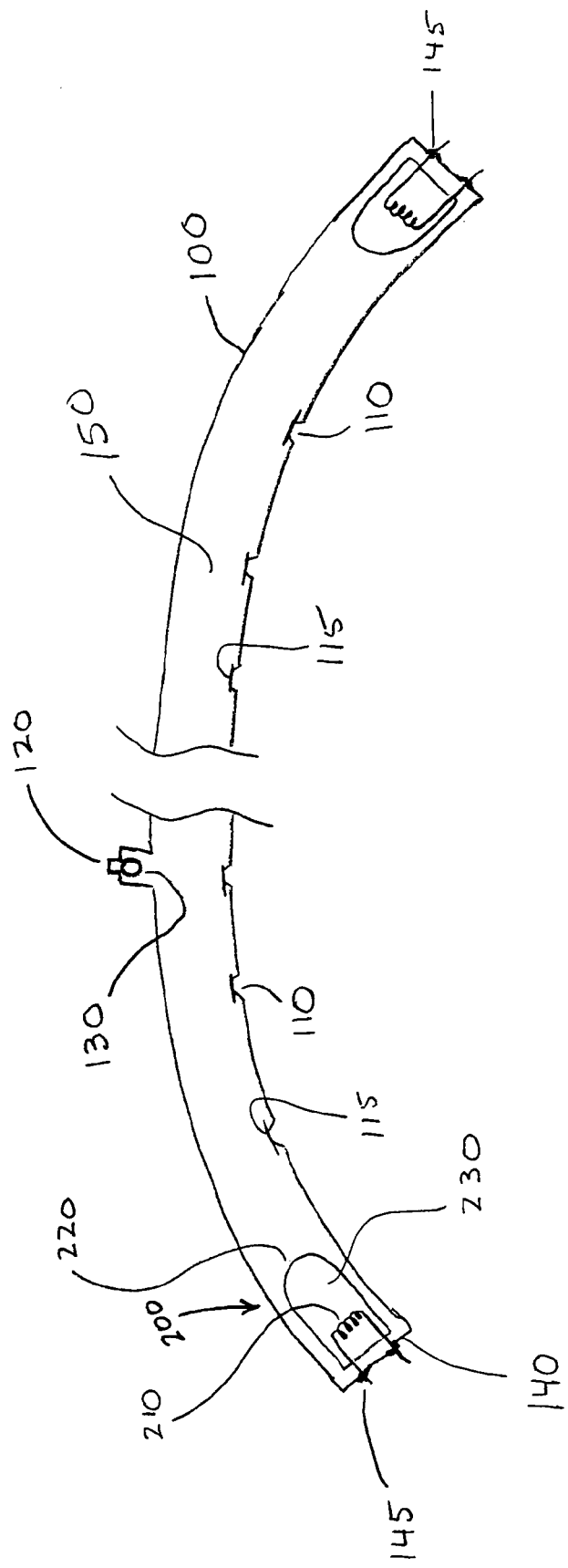
FIG. 1 is a cross-section side view of an inflator according to an exemplary embodiment of the present invention.

As shown in FIG. 1, inflator includes a pipe 100 having a plurality of openings 110. The pipe 100 includes an interior chamber 150 that is filled with an inert gas. The inert gas may include, for example, Argon or Helium. The inert gas may be charged into the pipe 100 through gas inlet opening 120. After the gas is charged into the pipe, the inlet 120 may be sealed, for example, by a ball weld 130. Thus, prior to initiation, the inflator is filled with a prepressurized gas.

The pipe 100 includes two ends 140. Each end 140 of the pipe contains an inflation device 200. The inflation device 200 includes an igniter or initiator 210 and a booster cap 220. The cap 220 covers the igniter 210 and contains a booster propellant 230. Each end 140 of the pipe is sealed by caulking material 145. The igniter 210 includes a portion that extends out of the pipe 100 and is operatively connected to a control circuit that sends a trigger signal to the igniter when a collision involving the related vehicle is determined to be imminent.

Prior to initiation of the inflator, each of the openings 110 is sealed. According to one exemplary embodiment of the present invention, the openings 110 are closed by a seal 115. The seal 115 is configured to rupture or break when the pressure of the inert gas reaches a predetermined level. The seal 115 may include tape or other similar membranes. Alternatively, as shown in FIG. 3, the opening 110 may be formed as a partial puncture 113 of the wall of the pipe 100. For example, the pipe 100 may be formed of stainless material and a punch may be used to partially penetrate the wall of the pipe 100 to create a weakened portion that ruptures when the pressure of the inert gas located in the pipe reaches a predetermined level.

As mentioned above, the pipe 100 may be formed of stainless steel or other material of sufficient strength to contain the pressurized gas. According to a preferred embodiment of the present invention, the pipe 100 may be bent to conform to the shape of the airbag containing the inflator. However if, for example, the airbag contains a substantially straight upper portion, the pipe 100 may extend along an essentially straight line as shown in FIG. 4.

Figure 2:
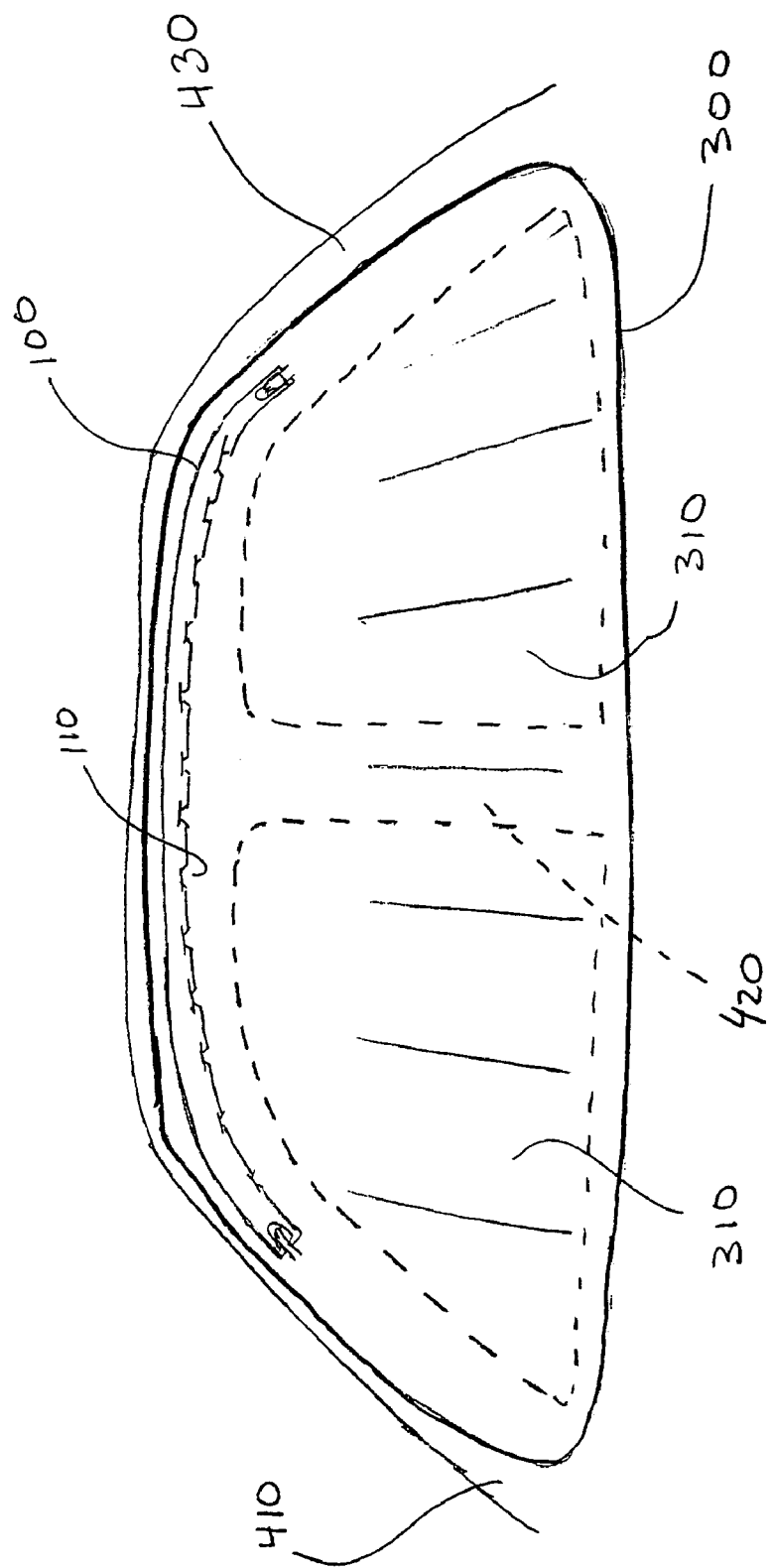
FIG. 2 is a side view of an occupant protecting device according to an embodiment of the present invention.

As shown in FIG. 2, the inflator may be positioned inside an airbag 300 for protecting an occupant of a vehicle. In a preferred embodiment of the present invention, the airbag 300 is configured to inflate along the side of a vehicle. As shown in FIG. 2, the airbag may extend from the A pillar 410 to cover the B pillar 420, and reach the C pillar 430. The airbag 300 may include multiple cells or section 310. Each of the inflation gas outflow openings 110 may be aligned with the cells 310. Furthermore, as shown in FIG. 2, the shape of the pipe or tube 100 may be curved to conform to the shape of the upper portion of the airbag 300.

In operation, the initiator 210 is triggered by a signal generated by a sensor (e.g., an acceleration type crash sensor) in response to the sensor detecting that a collision involving the vehicle is imminent. After triggering of the initiator 210, the booster propellant 230 ignites creating exhaust gas that ruptures the cap 220 and raises the pressure of the inert gas contained within the pipe 100. The pressure of the inert gas rises thereby causing the outflow openings 110 to become unsealed allowing gas to escape from the inflator into the airbag 300. As the gas exits the pipe 100 and enters the airbag 300, the airbag 300 deploys quickly and evenly along the side of the vehicle cab and covering the pillars of the vehicle 410, 420, 430.

The creation of a flow path through the openings 110 may occur, for example, due to the failure of a weakened portion 113 of the pipe 100 or due to the failure of a seal member 115. The opening 110 is configured so that the gas pressure required to rupture the seal and create the opening 110 can predetermined As shown in FIGS. 3 and 4, the gas outflow openings 110 may be positioned at various locations along the exterior of the pipe or tube 100. The positioning of the openings 110 in a variety of locations may allow some or all of the airbag 300 to be inflated more quickly.

As is evident from the description above, the provision of an inflator along substantially the entire lengths of the airbag 300 allows the airbag to be inflated quickly and evenly to thereby provide improved protection to the occupant of the vehicle.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An inflator for an airbag comprising:
   an elongated pipe containing an inert gas, wherein the elongated pipe comprises a circumferential surface and two opposite ends;
   a pair of igniters, wherein the igniters are positioned at the opposite ends of the pipe;
   wherein the elongated pipe contains a plurality of spaced apart openings at three or more different distances from one of the ends of the pipe along the circumferential surface of the pipe, wherein the openings are sealed until the inert gas reaches a predetermined pressure.

2. The inflator of claim 1, wherein the inert gas is prepressurized.

3. The inflator of claim 1, wherein each of the openings is covered by a rupturable seal.

4. The inflator of claim 1, further comprising a gas inlet for charging the inert gas into the pipe.

5. The inflator of claim 4, wherein the gas inlet is sealed.

6. The inflator of claim 5, wherein the gas inlet is sealed by ball welding.

7. The inflator of claim 1, wherein the pipe is curved.

8. The inflator of claim 1, further comprising a pair of caps, wherein each cap covers each of the igniters.

9. The inflator of claim 8, wherein each cap contains booster propellant.

10. The inflator of claim 8, wherein the ends of the pipe are sealed by caulking material.

11. The inflator of claim 9, wherein the ends of the pipe are sealed by caulking material.

12. A device for protecting an occupant of a vehicle comprising:
   an airbag positioned to inflate along an interior side of a vehicle;
   a pipe comprising a circumferential surface, two ends, and a sealed opening at each end, wherein the pipe extends in a longitudinal direction of the vehicle along an upper part of the airbag and is configured to conform to the shape of the upper part of the airbag, wherein the pipe is filled with pressurized gas, wherein the length of the pipe substantially corresponds to the length of the airbag in the longitudinal direction of the vehicle;

a plurality of gas outflow openings in the pipe positioned on the circumferential surface of the pipe to allow the pressurized gas to enter and inflate the airbag, wherein the gas outflow openings are sealed until the pressurized gas reaches a predetermined pressure;

a pair of inflation devices connected to the pipe, wherein each inflation device includes an initiator and a booster propellant for producing an exhaust gas for further pressurizing the pressurized gas, wherein each inflation device is positioned in one of the sealed openings located at the ends of the pipe so that the initiator can receive a triggering signal from a control device when the occurrence of a vehicle collision is detected by a sensor.

13. The device of claim 12, wherein the plurality of gas outflow openings is located at a plurality of different distances from one of the ends of the pipe along the circumferential surface of the pipe.

14. An inflator for an airbag comprising:

an elongated pipe containing an inert gas, wherein the elongated pipe comprises a circumferential surface and two opposite ends;

a pair of igniters, wherein the igniters are positioned at the opposite ends of the pipe; wherein the elongated pipe contains a plurality of spaced apart partial punctures forming weakened portions at a plurality of different distances from one of the ends of the pipe along the circumferential surface of the pipe, wherein the partial punctures rupture when the inert gas reaches a predetermined pressure.

* * * * *